(12) United States Patent
Lee et al.

(10) Patent No.: US 9,810,949 B2
(45) Date of Patent: Nov. 7, 2017

(54) APPARATUS FOR MANUFACTURING DISPLAY DEVICE AND METHOD FOR MANUFACTURING DISPLAY DEVICE USING THE SAME

(71) Applicant: Samsung Display Co., Ltd., Yongin-si, Gyeonggi-do (KR)

(72) Inventors: Mi Hwa Lee, Seoul (KR); Min Hee Kim, Ansan-si (KR); Soo Jung Youn, Seoul (KR); Chang Hun Lee, Hwaseong-si (KR); Sung Hwan Hong, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/169,858

(22) Filed: Jun. 1, 2016

(65) Prior Publication Data
US 2017/0146864 A1  May 25, 2017

(30) Foreign Application Priority Data
Nov. 19, 2015 (KR) .................. 10-2015-0162654

(51) Int. Cl.
*G02F 1/13* (2006.01)
*G02F 1/1337* (2006.01)
(Continued)

(52) U.S. Cl.
CPC ...... *G02F 1/133788* (2013.01); *G02F 1/1303* (2013.01); *G02F 1/133514* (2013.01);
(Continued)

(58) Field of Classification Search
CPC ......... G02F 1/133788; G02F 1/134363; G02F 1/1303; G02F 1/133514; G02F 2001/133397
See application file for complete search history.

(56) References Cited

U.S. PATENT DOCUMENTS

| 6,063,829 A | 5/2000 | Endou et al. |
| 2004/0119904 A1* | 6/2004 | Arai .................. G02F 1/134363 349/43 |

(Continued)

FOREIGN PATENT DOCUMENTS

| JP | 3146998 B2 | 1/2001 |
| JP | 2006-113180 A | 4/2006 |

(Continued)

*Primary Examiner* — Donald Raleigh
(74) *Attorney, Agent, or Firm* — Cantor Colburn LLP

(57) ABSTRACT

An apparatus for manufacturing a display device includes: a stage on which a substrate to be processed is supported, the substrate to be processed including a first alignment layer of the display device; an optical system facing the substrate to be processed which is supported on the stage, the optical system including a light source which irradiates ultraviolet rays to the substrate to be processed; and a mask which is interposed between the light source and the substrate to be processed which includes the first alignment layer of the display device. The mask defines: a transmitting portion thereof through which the ultraviolet rays irradiated from the light source are transmitted to the first alignment layer of the substrate to be processed, and a blocking portion thereof which blocks transmission of the ultraviolet rays irradiated from the light source to the substrate to be processed.

9 Claims, 10 Drawing Sheets

(51) Int. Cl.
*G02F 1/1335* (2006.01)
*G02F 1/1343* (2006.01)
*G02F 1/1333* (2006.01)

(52) U.S. Cl.
CPC .............. *G02F 1/134363* (2013.01); *G02F 2001/133397* (2013.01)

(56) References Cited

U.S. PATENT DOCUMENTS

| | | | | |
|---|---|---|---|---|
| 2011/0085097 | A1* | 4/2011 | Lee | G02F 1/133788 349/33 |
| 2012/0099070 | A1* | 4/2012 | Hirosawa | G02F 1/134309 349/143 |
| 2015/0301414 | A1* | 10/2015 | Hu | G02F 1/133707 257/72 |
| 2016/0077385 | A1* | 3/2016 | Cao | G02F 1/133512 349/96 |

FOREIGN PATENT DOCUMENTS

| | | | |
|---|---|---|---|
| JP | 3893659 | B2 | 12/2006 |
| JP | 4504665 | B2 | 4/2010 |

* cited by examiner

APPARATUS FOR MANUFACTURING DISPLAY DEVICE AND METHOD FOR MANUFACTURING DISPLAY DEVICE USING THE SAME

This application claims priority to Korean Patent Application No. 10-2015-0162654 filed on Nov. 19, 2015, and all the benefits accruing therefrom under 35 U.S.C. §119, the content of which in its entirety is herein incorporated by reference.

BACKGROUND

1. Field

The invention relates to an apparatus for manufacturing a display device and a method for manufacturing a display device using the same.

2. Description of the Related Art

Importance of display devices is increasing along with the development of multimedia. Accordingly, various kinds of display devices such as liquid crystal displays ("LCDs") and organic light emitting displays ("OLEDs") are being used.

Specifically, liquid crystals are aligned in a predetermined direction between an upper substrate and a lower substrate so as to enable a liquid crystal display device to display an image. A degree of uniformity of a liquid crystal alignment plays a significant role in determining the quality of image displayed by a liquid crystal display device.

A general method for aligning liquid crystals may be performed by forming an alignment layer adjacent to the liquid crystals in a liquid crystal display device and allowing the surface of the alignment layer to undergo a mechanical or physical process. This mechanical or physical process is generally referred to as a rubbing process. However, in the rubbing process, fine dust or static electricity may be generated by friction, and the dust, static electricity or the like generated by the rubbing process may cause significant defects in the liquid crystal display device.

SUMMARY

One or more exemplary embodiment of the invention provides an apparatus for manufacturing a display device for which generation of an afterimage is reduced or effectively prevented.

One or more exemplary embodiment of the invention provides an apparatus for manufacturing a display device with improved display performance.

According to an exemplary embodiment of the invention, there is provided an apparatus for manufacturing a display device, including a stage on which a substrate to be processed is supported, the substrate to be processed including a first alignment layer of the display device; an optical system facing the substrate to be processed which is supported on the stage, the optical system including a light source which irradiates ultraviolet rays to the substrate to be processed; and a mask which is interposed between the light source and the substrate to be processed which includes the first alignment layer of the display device. The mask defines: a transmitting portion thereof through which the ultraviolet rays irradiated from the light source are transmitted to the first alignment layer of the substrate to be processed, and a blocking portion thereof which blocks transmission of the ultraviolet rays irradiated from the light source to the substrate to be processed.

The substrate to be processed may further include a display area of the display device at which an image is displayed and a non-display area of the display device at which the image is not displayed, the non-display area being disposed outside the display area, and the first alignment layer is disposed in the display area and extends therefrom to the non-display area.

The blocking portion of the mask may correspond to the non-display area and the transmitting portion of the mask may correspond to the display region.

The optical system may further include a bandpass filter between the light source and the stage.

The optical system may further include a polarizing plate between the light source and the stage.

The first alignment layer may be a photo-alignment layer.

The substrate to be processed may further include a first substrate of the display device and an overcoat layer of the display device which is on the first substrate. The blocking portion of the mask may block transmission of the ultraviolet rays irradiated from the light source to the overcoat layer which is on the first substrate of the substrate to be processed.

The substrate to be processed may further include a color filter of the display device on the first substrate.

The substrate to be processed may further include a plurality of cells, and each of the cells may include a display area of the display device at which an image is displayed and a non-display area of the display device at which the image is not displayed, the non-display area disposed outside the display area. The first alignment layer may be disposed in each of the display areas and extends therefrom to the non-display areas.

Among the plurality of cells of the substrate to be processed, the transmitting portion of the mask may correspond to the display area of each cell and the blocking portion of the mask may correspond to the non-display area of each cell.

The mask may define the transmitting portion in plural which may be arranged in a matrix having a plurality of rows and a plurality of columns.

According to another exemplary embodiment of the invention, there is provided a method for manufacturing a display device, including preparing a substrate to be processed, the substrate to be processed including: a display area of the display device at which an image is displayed defined therein, a non-display area at which the image is not displayed defined therein, a first substrate of the display device, and a first alignment layer of the display device which is on the first substrate, the first alignment layer being disposed in the display area and the non-display area; irradiating ultraviolet rays to the substrate to be processed including the first alignment layer, by using a mask having a transmitting portion which transmits the ultraviolet rays to the first alignment layer of the substrate to be processed and a blocking portion which blocks transmission of the ultraviolet rays to the substrate to be processed; and bonding an opposed substrate which faces the substrate to be processed to the substrate to be processed.

In irradiating ultraviolet rays to the substrate to be processed, the transmitting portion of the mask may be disposed to face the display area and the blocking portion of the mask may be disposed to face the non-display area.

Furthermore, irradiating ultraviolet rays to the substrate to be processed may include the irradiating ultraviolet rays to the display area of the substrate to be processed through the transmitting portion of the mask to align the first alignment layer.

The substrate to be processed may further include an overcoat layer of the display device, and the overcoat layer may be between the first alignment layer and the first substrate.

The substrate to be processed may further include a color filter of the display device which is on the first substrate.

The opposed substrate may further include a second substrate of the display device, a pixel electrode of the display device which is on the second substrate, and a common electrode of the display device which is on the pixel electrode.

The pixel electrode and the common electrode may generate a horizontal field therebetween.

Other detailed matters of exemplary embodiments of the invention are included in the detailed description and drawings.

One or more exemplary embodiments of the invention may at least exhibit effects as follows.

Appearance of an afterimage can be reduced or effectively prevented in a display area of a display device since side effects to the display area which may be caused by energy of the ultraviolet rays during photo-aligning an alignment film are reduced or effectively prevented.

Furthermore, since side effects to the display area which may be caused by energy of the ultraviolet rays during photo-aligning an alignment film are reduced or effectively prevented, a display device with improved image quality can be manufactured.

However, effects of the invention are not restricted to the exemplary embodiments set forth herein and more diverse effects are included in this description.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
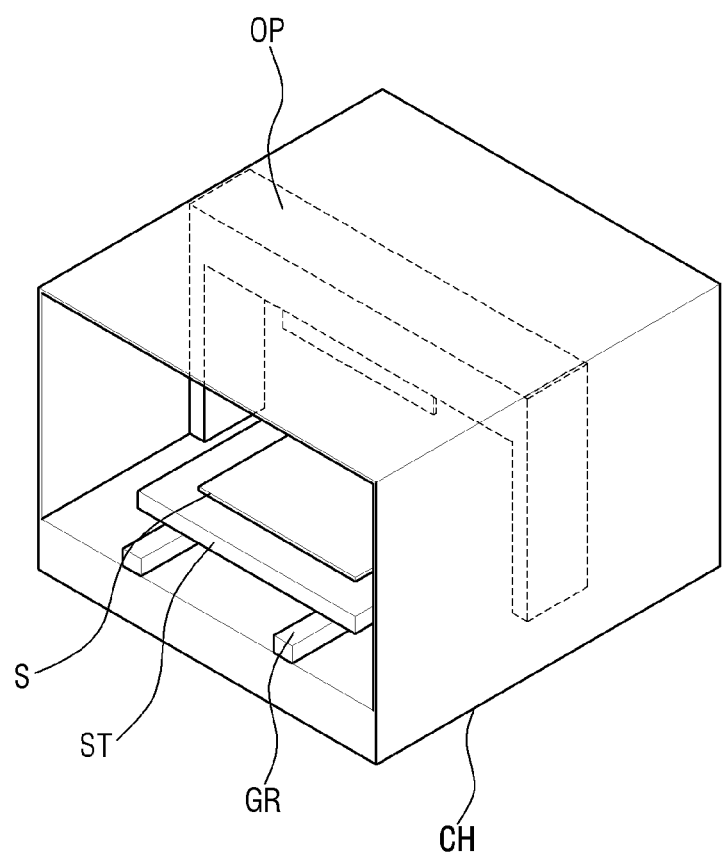
FIG. 1 is a perspective view of an exemplary embodiment of an apparatus for manufacturing a display device according to the invention.

Exemplary embodiments of the invention are not restricted to those set forth herein. Other exemplary embodiments of the invention which are not mentioned herein will become more apparent to a person skilled in the art to which the invention pertains by referencing the detailed description of the invention given below.

The features of the invention and methods for achieving the features will be apparent by referring to the embodiments to be described in detail with reference to the accompanying drawings. However, the invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the attached drawings.

A method for aligning an alignment layer which is adjacent to liquid crystals in a liquid crystal display device by a photo process rather than a mechanical process has been introduced. The photo alignment process is characterized by irradiating ultraviolet rays or a laser beam to the alignment layer so as to provide orientation to the alignment layer. However, for such a photo alignment process, various side effects may be caused by energy of the ultraviolet rays or the laser beam, and thus several attempts have been made in the art to reduce or effectively prevent such side effects.

Figure 2:
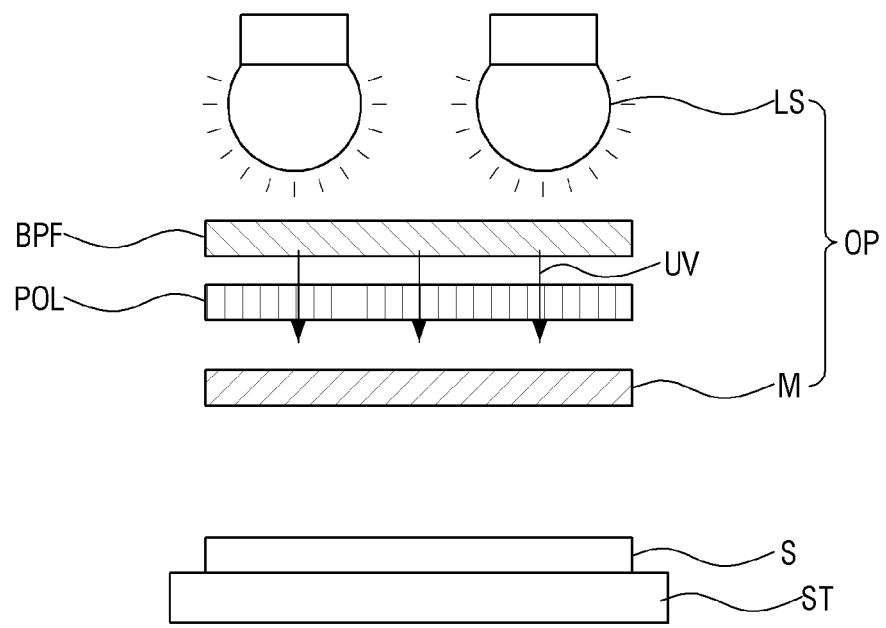
FIG. 2 is an exploded cross-sectional view illustrating an exemplary embodiment of components of the apparatus of FIG. 1.
Figure 3:
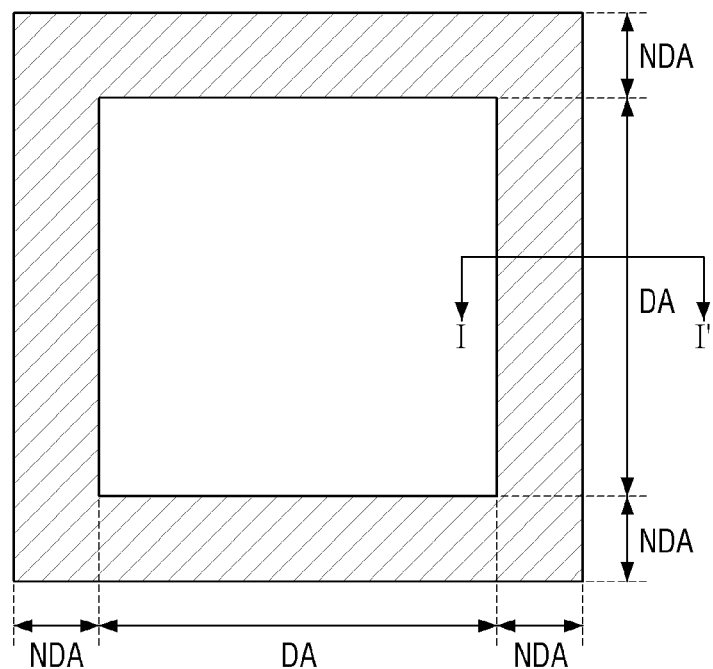
FIG. 3 is a top plan view illustrating an exemplary embodiment of an object to be processed using the apparatus for manufacturing a display device of FIG. 1 according to the invention.
Figure 4:
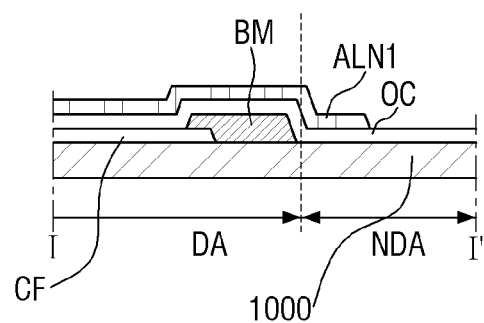
FIG. 4 is a cross sectional view taken along line I-I' of FIG. 3.
Figure 5:
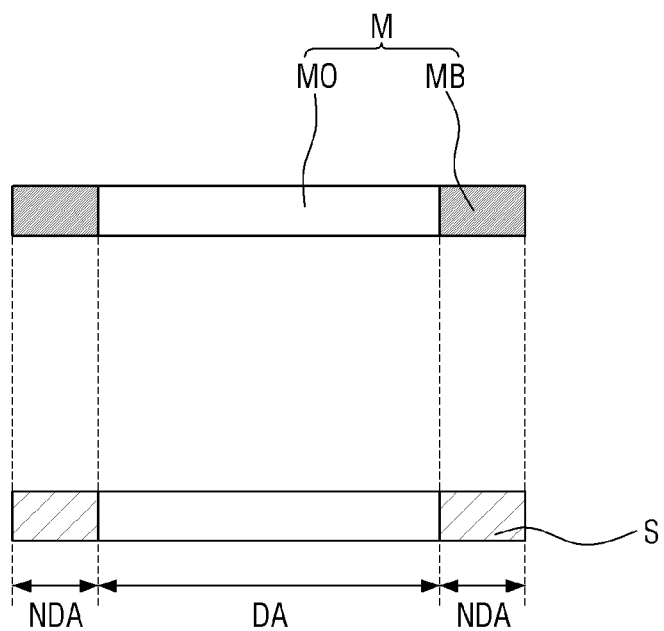
FIG. 5 is a schematic cross-sectional view illustrating an exemplary embodiment of a relationship between components of an apparatus for manufacturing a display device and the object to be processed of FIG. 3 according to the invention.

FIG. 1 is a perspective view of an exemplary embodiment of an apparatus for manufacturing a display device according to the invention. FIG. 2 is an exploded cross-sectional view illustrating an exemplary embodiment of components of the apparatus of FIG. 1. FIG. 3 is a top plan view illustrating an exemplary embodiment of an object to be processed using the apparatus for manufacturing a display device of FIG. 1 according to the invention. FIG. 4 is a cross sectional view taken along line I-I' of FIG. 3. FIG. 5 is a schematic cross-sectional view illustrating an exemplary embodiment of a relationship between components of an apparatus for manufacturing a display device and the object to be processed of FIG. 3 according to the invention.

Referring to FIG. 1 to FIG. 5, an exemplary embodiment of an apparatus for manufacturing a display device according to the invention may include a stage ST on which a substrate S to be processed having a first alignment layer ALN1 formed thereon is supported; a light source LS which is disposed on the stage ST so as to irradiate ultraviolet rays to the substrate S to be processed; and a mask M which is interposed between the substrate S to be processed and the light source LS. The mask M includes a transmitting portion MO which transmits therethrough ultraviolet rays irradiated from the light source LS and a blocking portion MB which blocks transmission therethrough of the ultraviolet rays irradiated from the light source LS. The blocking portion MB and the transmitting portion MO may define a whole of the mask M.

Referring to FIG. 1, the exemplary embodiment of the apparatus for manufacturing a display device according to the invention may include a chamber CH. The chamber CH may provide or define a space in which various components of the apparatus are disposed, as described later. Although the chamber CH is depicted as having a rectangular parallelepiped shape in FIG. 1, the shape of the chamber CH is not limited thereto.

In one exemplary embodiment, the space in the chamber CH may be cut off from an environment outside thereof such as being cut off from outside air. In other words, the space in the chamber CH may be a sealed space.

In another exemplary embodiment, the space in the chamber CH may be in a vacuum state. Where the space in the chamber CH is in a vacuum state, the apparatus for manufacturing a display device may further include a vacuum pump (not shown) and the like for maintaining the vacuum state of the space defined in the chamber CH.

The stage ST may be disposed in the chamber CH. The stage ST may serve to support the substrate S to be processed, which will be described later. Specifically, the stage ST may support and/or fix the substrate S to be processed within the chamber CH. Thus, deviation from a predetermined position of the substrate S to be processed within the chamber CH can be reduced or effectively prevented during a manufacturing process. In one exemplary embodiment the stage ST may move in a horizontal or vertical direction, such as in a plane defined by first and second directions. In an exemplary embodiment, for example, the stage ST may be disposed on a guide rail GR within the chamber CH so as to move in a horizontal direction along the guide rail GR. Although the stage ST is being depicted relative to the guide rail GR to be movable along the guide rail GR in FIG. 1, the horizontal movement direction of the stage ST is not limited thereto. That is, in other exemplary embodiments, the stage ST may move in a horizontal direction by a roller or other mechanical means. That is, the scope of the present disclosure is not limited by the movement method of the stage ST.

Although not shown in the drawings, the stage ST may move in upward and downward directions, such as in a third direction and a direction opposite thereto which are each perpendicular to the plane defined by the first and second directions. In an exemplary embodiment, for example, the stage ST may move in upward and downward directions by a lift pin (not shown). However, the movement method of the stage ST is not limited thereto like in the horizontal movement.

In other exemplary embodiments, the stage ST may be move by a robot arm. In an exemplary embodiment, for example, the stage ST may move from an area outside the chamber CH to an inside of the chamber CH or from the inside of the chamber CH to outside the chamber, by a robot arm.

Furthermore, the stage ST may further include a fixing member (not shown) for fixing the substrate S to be processed.

An optical system OP may be disposed above the stage ST. The optical system OP may be disposed above the stage ST such that the optical system OP may be spaced apart from the stage ST in a direction perpendicular to the plane of the state ST by predetermined spacing. The optical system OP may selectively irradiate ultraviolet rays to the substrate S to be processed, which will be described later.

The optical system OP will be described in detail with reference to FIG. 2.

The optical system OP may include the light source LS which irradiates ultraviolet rays, a bandpass filter BPF which passes only an ultraviolet ray of a specific wavelength among the ultraviolet rays irradiated from the light source LS, a polarizing plate POL which passes only an ultraviolet ray in at least one direction, and a mask M which blocks a part of ultraviolet rays and transmits a part of ultraviolet rays. The light source LS may be provided in plural within the optical system OP.

The light source LS may provide ultraviolet rays to the substrate S to be processed. To this end, the light source LS may include at least one ultraviolet lamp.

The bandpass filter BPF may be disposed adjacent to the light source LS. That is, the bandpass filter BPF may be interposed between the light source LS and the stage ST. The bandpass filter BPF may pass only an ultraviolet ray of a specific wavelength among the ultraviolet rays provided from the light source LS. In an exemplary embodiment, for example, the bandpass filter BPF may pass an ultraviolet ray having a wavelength ranging from about 200 nanometers (nm) to about 300 nm.

The polarizing plate POL may be disposed adjacent to the bandpass filter BPF. In other words, the polarizing plate POL may be interposed between the light source LS and the stage ST. The polarizing plate POL may polarize the ultraviolet rays provided from the light source LS. In other words, the polarizing plate POL may pass only an ultraviolet ray in at least one direction among the ultraviolet rays provided from the light source LS. In an exemplary embodiment, for example, the polarizing plate POL may pass an ultraviolet ray only in one direction or ultraviolet rays in two directions.

Although FIG. 2 illustrates the bandpass filter BPF interposed between the light source LS and the polarizing plate POL, a positional relationship between the polarizing plate POL and the bandpass filter BPF is not limited thereto. In other exemplary embodiments, for example, the polarizing plate POL may be interposed between the light source LS and the bandpass filter BPF.

The mask M may be disposed adjacent to the polarizing plate POL. In other words, the mask M may be interposed between the light source LS and the stage ST.

The mask M may include or define the transmitting portion MO which transmits therethrough the ultraviolet rays provided from the light source LS and the blocking portion MB which blocks transmission therethrough of the ultraviolet rays provided from the light source LS. In other words, the mask M having the aforementioned portions may selectively transmit the ultraviolet rays provided from the light source LS.

The blocking portion MB of the mask M may absorb or reflect ultraviolet rays so as to reduce or effectively prevent irradiation of ultraviolet rays to a portion of the area of the substrate S to be processed corresponding to the blocking portion MB. The transmitting portion MO of the mask M may transmit therethrough a portion of the ultraviolet rays provided from the light source LS. To this end, the transmitting portion MO may define or have at least an aperture. The transmitting portion MO may irradiate ultraviolet rays to another portion of the area of the substrate S to be processed different from the portions of the area corresponding to the blocking portion MB. As will be described in detail later, the blocking portion MB of the mask M may correspond to a non-display area NDA of the substrate S to be processed, and the transmitting portion MO of the mask M may correspond to a display area DA of the substrate S to be processed. In other words, the display area DA of the substrate S to be processed may be irradiated with ultraviolet rays by the transmitting portion MO of the mask M and the non-display area NDA of the substrate S to be processed may not be irradiated with ultraviolet rays by the blocking portion MB of the mask M.

The substrate S to be processed will be described in detail with reference to FIG. 3. In one exemplary embodiment, the substrate S to be processed may have the display area DA and the non-display area NDA defined therein. The non-display area NDA and the display area DA may define a whole of the substrate S1 to be processed. The display area DA refers to an area of a display device where an image is displayed, and the non-display area NDA refers to an area of a display device where an image is not displayed. The non-display area NDA is disposed outside the display area DA and various signal lines provided therein may be extended into or connected to portions of the signal lines within the display area DA so as to enable the display area DA to display an image.

Although FIG. 3 depicts the display area DA as having a quadrangular shape and the non-display area NDA as having a frame shape enclosing the display area DA, the shapes of the display area DA and the non-display area NDA are not limited thereto, and in other exemplary embodiments, the display area DA and the non-display area NDA may be at least partially curved or may have a polygonal shape with several sides.

In one exemplary embodiment, the substrate S to be processed may be an upper substrate or a lower substrate of a liquid crystal display device.

The substrate S to be processed is depicted as an upper substrate of a liquid crystal display device in FIG. 4.

Referring to FIG. 4, the collective substrate S to be processed may include a first (base) substrate 1000, a color filter CF, a black matrix BM, an overcoat layer OC and the first alignment layer ALN1 which is disposed or formed on the overcoat layer OC.

The first substrate 1000 may include or be made of a material having heat resistance and transmittance. The first substrate 1000 may include or be made of, for example, transparent glass or plastic, but the present disclosure is not limited thereto.

The color filter CF may be disposed on the first substrate 1000. The color filter CF may include one or more color filters selected from a blue color filter, a green color filter and a red color filter. In an exemplary embodiment, the blue color filter, the green color filter and the red color filter may have heights different from each other taken from a common reference such as a surface of the first substrate 1000. However, in other exemplary embodiments, the color filter CF may be omitted. In one exemplary embodiment, for example, the color filter CF may be disposed or formed in a lower substrate in the liquid crystal display device having the upper and lower substrates.

The black matrix BM may be disposed or formed on the first substrate 1000. The black matrix BM may serve to block light incident from outside the liquid crystal display device. To this end, the black matrix BM may include or be made of photosensitive resin including a black pigment. However, photosensitive resin is merely exemplary and the material of the black matrix BM is not limited thereto and any material having physical properties necessary to block light incident from outside can be used as a material for the black matrix. However, the black matrix BM can be omitted in other exemplary embodiments. In one exemplary embodiment, for example, the black matrix BM may be disposed or formed in a lower substrate in the liquid crystal display device having the upper and lower substrates.

The overcoat layer OC may be disposed on the color filter CF, the black matrix BM and the first substrate 1000. The overcoat layer OC may include or be made of a material including an organic or inorganic insulation material. The overcoat layer OC may be disposed or formed on the whole surface of the first substrate 1000. In other words, the overcoat layer OC may cover the whole surface of the display area DA and at least a part of the non-display area NDA.

In one exemplary embodiment, the substrate S to be processed may be an upper substrate of a plane line switching ("PLS") type liquid crystal display device. For the PLS type liquid crystal display device, a common electrode CE may not be disposed on the substrate S to be processed as is shown in FIG. 4.

The first alignment layer ALN1 may be disposed on the overcoat layer OC. The overcoat layer OC is exposed in the non-display area NDA, where the overlying overcoat OC is not disposed. The first alignment layer ALN1 for initially aligning a liquid crystal layer interposed between the first substrate 1000 and a second substrate 500 (see FIG. 10) may include a polymer material in which one reaction among a decomposition, a dimerization and an isomerization occurs by the irradiation of light (for example, ultraviolet ("UV") rays or laser beams). Furthermore, the first alignment layer ALN1 may include or be made of polymers in which reactive mesogens are polymerized.

In one exemplary embodiment, the first alignment layer ALN1 may be a photo-alignment layer. The term "photo-alignment layer" as used herein may mean the alignment layer is aligned by an optical process rather than a mechanical process (such as a rubbing process) during an early liquid crystal alignment stage within a method of manufacturing the liquid crystal display device. That is, the photo-alignment layer may be irradiated with UV rays or laser beams so as to provide orientation to the first alignment layer ALN1.

An exemplary embodiment of a relationship between the mask M and the substrate S to be processed in the apparatus for manufacturing a display device according to the invention will now be described with reference to FIG. 5.

As described above, the mask M may include the blocking portion MB which blocks ultraviolet rays irradiated from the light source LS and the transmitting portion MO which transmits ultraviolet rays irradiated from the light source LS. In one exemplary embodiment, the blocking portion MB of the mask M may correspond to the non-display area NDA of the substrate S to be processed and the transmitting portion MO of the mask M may correspond to the display area DA of the substrate S to be processed.

Accordingly, with the mask M disposed between the light sources LS and the substrate S to be processed, the display area DA may be irradiated with the ultraviolet rays provided from the light source LS and the non-display area NDA may not be irradiated with the ultraviolet rays provided from the light source LS. Referring to FIG. 4, if the ultraviolet rays are directly irradiated to the overcoat layer OC exposed in the non-display area NDA, the exposed overcoat layer OC may undesirably react to the ultraviolet rays so as to generate a side effect such as outgas, and the thus-generated outgas may then permeate through the display area DA, which may cause an afterimage outside the display area DA. However, referring to FIG. 4 and FIG. 5, when the ultraviolet rays irradiated to the non-display area NDA are blocked by the blocking portion MB of the mask M, the ultraviolet rays are not directly irradiated to the overcoat layer OC exposed in the non-display area NDA and therefore generation of the side effect outgas may be reduced or effectively prevented. Further, since the generation of outgas may be reduced or effectively prevented, an afterimage may be reduced or effectively prevented from occurring in the display area DA. That is, a display device may have improved display performance.

Another exemplary embodiment of a display device according to the invention will be described hereinafter. In the exemplary embodiment described below, identical reference numerals are used to designate elements identical with those already described above, and duplicated descriptions will be omitted or simplified.

Figure 6:
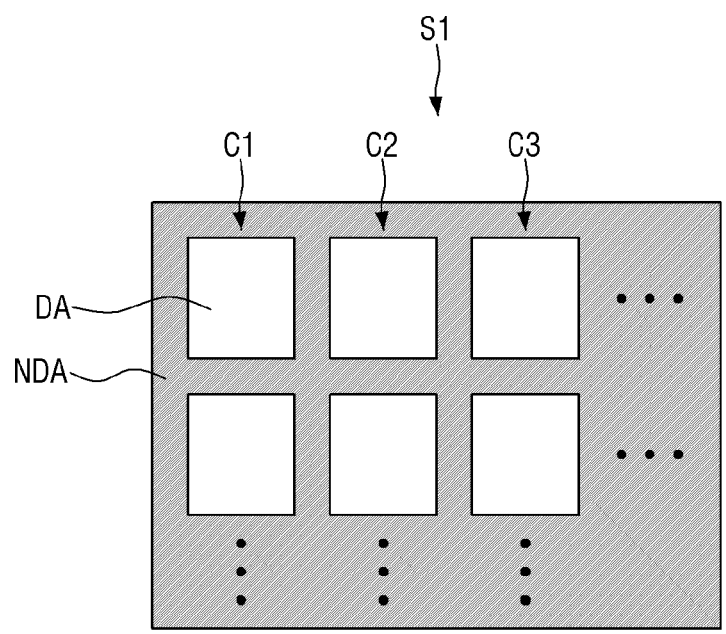
FIG. 6 is a top plan view illustrating another exemplary embodiment of an object to be processed using the an apparatus for manufacturing a display device of FIG. 1 according to the invention.
Figure 7:
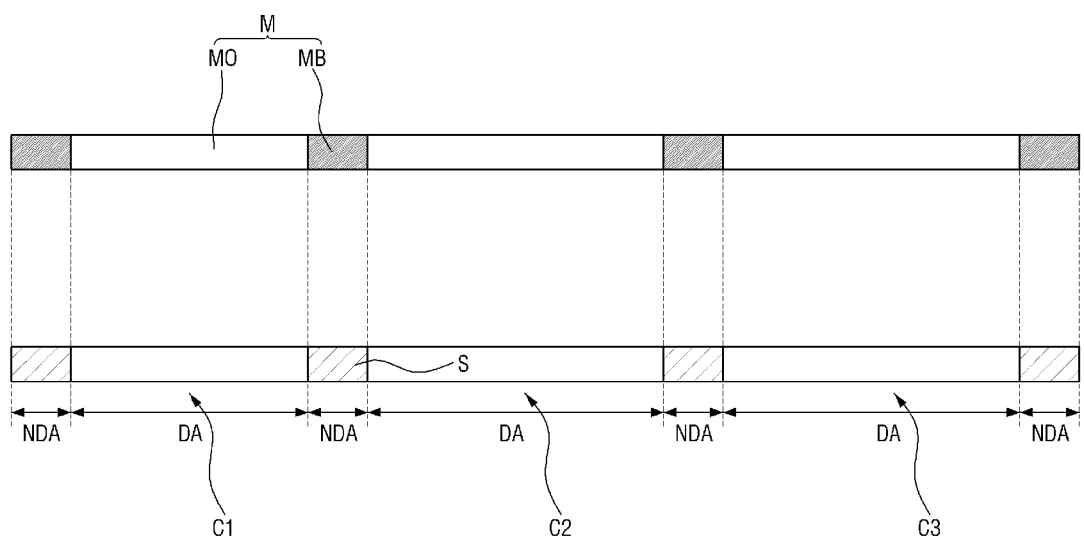
FIG. 7 illustrates another exemplary embodiment of a relationship between components of an apparatus for manufacturing a display device and the object to be processed of FIG. 6 according to the invention.

FIG. 6 is a top plan view illustrating another exemplary embodiment of an object to be processed using an apparatus for manufacturing a display device of FIG. 1 according to the invention. FIG. 7 illustrates another exemplary embodiment of a relationship between components of an apparatus for manufacturing a display device and the object to be processed of FIG. 6.

Referring to FIG. 6 and FIG. 7, the exemplary embodiment of the apparatus for manufacturing a display device according to the invention differs from the apparatus described with reference to FIG. 1 in that components of the apparatus are adjusted to correspond to a substrate S1 to be processed which includes a plurality of cells.

The substrate S1 to be processed may include a plurality of cells. The cell as used herein may mean one portion including one display area applied to a display device.

The plurality of cells may be arranged into a matrix having a plurality of columns each lengthwise extended in a first direction and a plurality of rows each lengthwise extended in a second direction crossing (e.g., perpendicular) to the first direction, in the top plan view. However, the matrix arrangement described above is merely exemplary, and the arrangement of the plurality of cells is not limited thereto.

For convenience of description, a portion of the plurality of cells will specifically be described. A group of cells among the plurality of cells may include a first cell C1, a second cell C2 and a third cell C3. Each of the first cell C1, the second cell C2 and the third cell C3 may include a display area DA and a non-display area NDA associated therewith. However, the first cell C1, the second cell C2 and the third cell C3 may partially share the overall non-display area NDA of the substrate S1. That is, the first cell C1, the second cell C2 and the third cell C3 may be separated or cut from an original substrate S1 to form discrete display devices, and the substrate S1 to be processed described with reference to FIG. 6 may be an original whole (mother) substrate before separation of the individual display devices.

Referring to FIG. 7, the overall mask M may correspond to the overall substrate S1 to be processed. Specifically, the blocking portion MB and the transmitting portion MO of the mask M may be respectively disposed to correspond to the non-display area NDA and the display area DA of the substrate S1 to be processed. The blocking portion MB and the transmitting portion MO may define a whole of the mask M and the non-display area NDA and the display area DA may define a whole of the substrate S1 to be processed. That is, the transmitting portions MO of the mask M may be disposed to respectively correspond to the display areas DAs of the first cell C1, the second cell C2 and the third cell C3.

Thus, the display areas DAs of the first cell C1, the second cell C2 and the third cell C3 may be irradiated with the ultraviolet rays provided from the light source LS.

That is, in an exemplary embodiment in which the first cell C1, the second cell C2 and the third cell C3 are arranged into a matrix having a plurality of rows and columns, the transmitting portions MOs of the mask M may be arranged into a matrix having a plurality of rows and columns to correspond to the display areas of the plurality of cells. In a top plan view of the mask M, where the transmitting portions MOs of the mask M are arranged in a matrix, the blocking portion MB may be interposed between the transmitting portion MOs.

In other words, the blocking portions MBs and the transmitting portions MOs may be arranged alternately with each other at least once along a first direction in the top plan view. That is, the blocking portions MBs and the transmitting portions MOs may be arranged alternately with each other.

When the substrate S1 to be processed includes a plurality of cells as described above, a plurality of display devices to be formed from the original substrate S1 may be simultaneously processed by the apparatus for manufacturing a display device according to the invention, thereby improving process productivity.

An exemplary embodiment of a method for manufacturing a display device according to the invention will now be described. Some of components described below may be identical with the components of the liquid crystal display device of the exemplary embodiments described above, and thus explanation of some of components can be omitted to avoid duplication.

Figure 8:
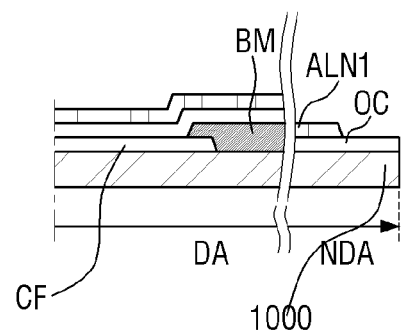
FIG. 8 to FIG. 10 are cross-sectional views illustrating an exemplary embodiment of a method for manufacturing a display device according to the invention.
Figure 9:
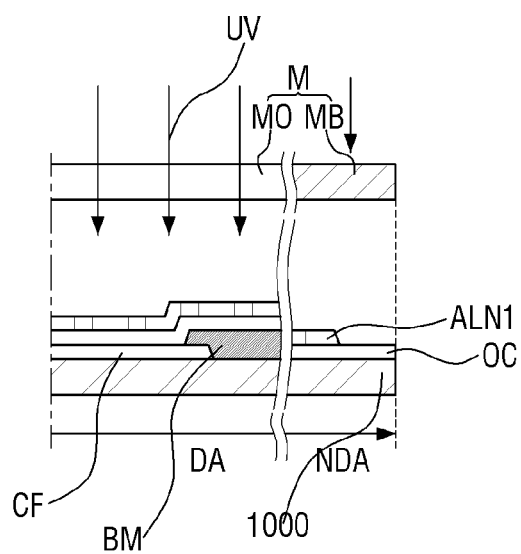
Figure 10:
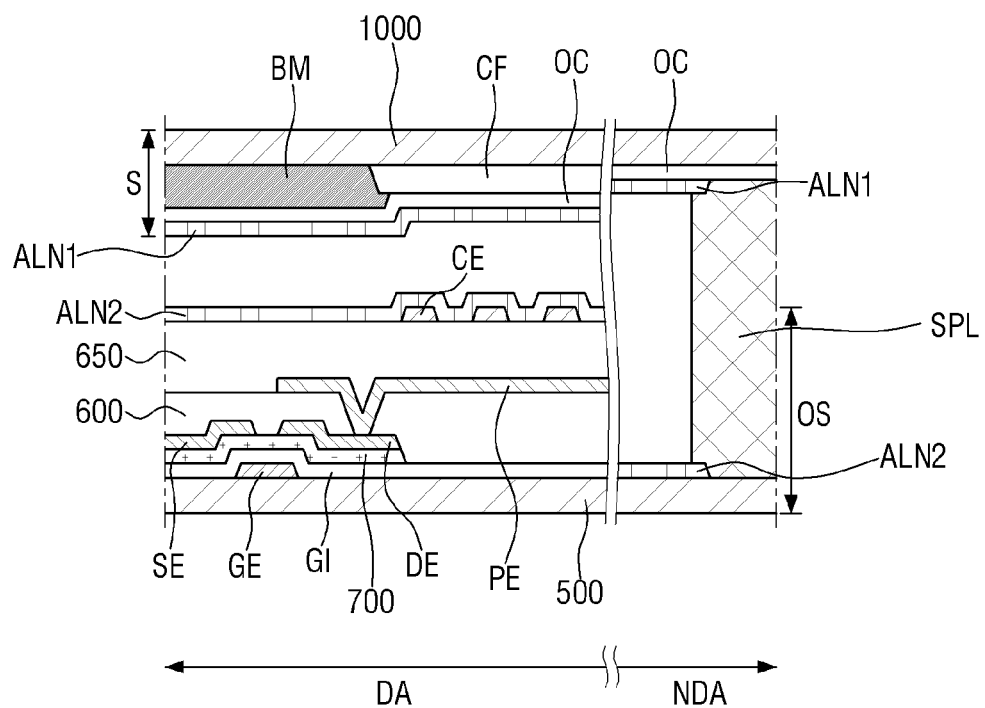

FIG. 8 to FIG. 10 are cross-sectional views illustrating an exemplary embodiment of a method for manufacturing a display device according to the invention. The substrate S of FIG. 3 is described below as an example, but it will be understood that the method described below may also be applied to the substrate S1 of FIG. 6.

Referring to FIG. 8 to FIG. 10, an exemplary embodiment of a method for manufacturing a display device according to the invention may include preparing a substrate S to be processed in which a display area DA and a non-display area NDA are defined, and which includes a first substrate 1000 and a first alignment layer ALN1 which is formed on the first substrate 1000 and exposes an overcoat layer OC in the non-display area NDA thereof; irradiating ultraviolet rays to the display area DA by using a mask M having or defining a transmitting portion MO for transmitting ultraviolet rays therethrough and a blocking portion MB for blocking transmission of ultraviolet rays therethrough; and bonding an opposed substrate OS facing the substrate S to be processed to the substrate S to be processed.

Referring to FIG. 8, the substrate S to be processed may be prepared in which the display area DA and the non-display area NDA are defined, and which includes the first substrate 1000 and an overcoat layer OC formed on the first substrate 1000. The overcoat layer OC is exposed in the non-display area NDA.

The substrate S may include a black matrix BM and/or a color filter CF may be disposed on the first substrate 1000. Descriptions thereof are substantially the same as those of FIG. 4, and thus detailed descriptions thereof will be omitted. That is, the substrate S to be processed may be substantially the same as those described with reference to FIG. 3, FIG. 4 and FIG. 6 above.

In exemplary embodiments of the substrate S, the black matrix BM and/or the color filter CF may be omitted. The overcoat layer OC may be disposed or formed on the black matrix BM, the color filter CF and the first substrate 1000. The overcoat layer OC may be a planarizing layer of the substrate S and may be extended or formed on the whole surface of the first substrate 1000. That is to say, the overcoat layer OC may cover the whole surfaces of the display area DA and the non-display area NDA defined on the first substrate 1000. Subsequently, the first alignment layer ALN1 may be disposed on the overcoat layer OC. The first alignment layer ALN1 may be substantially the same as those described with reference to FIG. 4. The first alignment layer ALN1 may be formed on the whole surface of the display area DA and at least partially on the non-display area NDA. The first alignment layer ALN1 in a portion of the non-display area NDA may expose the underlying overcoat layer OC which is formed on the whole surface of the first substrate 1000.

Referring now to FIG. 9, irradiating ultraviolet rays to the display area DA may be performed by using a mask M having a transmitting portion MO for transmitting ultraviolet rays therethrough and a blocking portion MB for blocking transmission of the ultraviolet rays therethrough. The mask M may be substantially the same as those of the apparatuses for manufacturing a display device according to the above-described exemplary embodiments of the invention.

The blocking portion MB of the mask M may correspond to the non-display area NDA of the substrate S to be processed and the transmitting portion MO of the mask M may correspond to the display area DA of the substrate S to be processed. In other words, in an exemplary embodiment of the method for manufacturing a display device according to the invention, the blocking portion MB of the mask M may be disposed to overlap the non-display area NDA of the substrate S to be processed and the transmitting portion MO of the mask M may be disposed to overlap the display area DA of the substrate S to be processed.

The ultraviolet rays irradiated from the light source LS may be blocked by the blocking portion MB. Thus, no ultraviolet rays may be irradiated to the non-display area NDA at which the overcoat layer OC is exposed. Furthermore, the transmitting portion MO may at least partially transmit the ultraviolet rays irradiated from the light source LS. Thus, the display area DA at which the overcoat layer OC is completely covered by another layer of the substrate S may be irradiated with the ultraviolet rays. The ultraviolet rays may be, for example, photo-aligning ultraviolet rays. That is, the first alignment layer ALN1 disposed in the display area DA may be aligned in a certain direction by the ultraviolet rays irradiated to the display area DA.

Referring to FIG. 10, the opposed substrate OS is disposed to face the substrate S to be processed and may be bonded to the substrate S to be processed.

The opposed substrate OS will now be described in detail. In one exemplary embodiment, the opposed substrate OS may include the second substrate 500 on which layers of the opposed substrate OS are disposed. A gate electrode GE, a gate insulation layer GI, a semiconductor pattern layer 700, a source electrode SE, a drain electrode DE, a pixel electrode PE, a common electrode CE and a second alignment layer ALN2 are disposed on the second substrate 500.

The second substrate 500 may include or be made of a material having heat resistance and transmittance. The second substrate 500 may include or be formed of, for example, transparent glass or plastic, but the present disclosure is not limited thereto. The second substrate 500 may have the display area DA and the non-display area NDA defined therein. The display area DA and the non-display area NDA of the second substrate 500 respectively correspond to the same of the first substrate 1000.

The display area DA refers to an area of a finally-formed display device where an image is displayed, and the non-display area NDA refer to an area of the finally-formed display device in which the image is not displayed. Various signal lines in the display area DA used to display the image may extend to the non-display area NDA. Other layers disposed or formed in the display area DA may extend to define portions thereof disposed or formed in the non-display area NDA.

The gate electrode GE may be disposed on the second substrate 500. The gate electrode GE may be branched from a gate line (not shown) as a signal line among the various signal lines. The gate line and the gate electrode GE branched therefrom may include at least one of aluminum (Al)-based metal including an aluminum alloy, silver (Ag)-based metal including a silver alloy, copper (Cu)-based metal including a copper alloy, a molybdenum (Mo)-based metal including a molybdenum alloy, chrome (Cr), titanium (Ti) and tantalum (Ta).

The gate line and the gate electrode GE branched therefrom may have a single layer structure, but the present disclosure is not limited thereto, and the gate line and the gate electrode GE branched therefrom may have a multilayer structure of double layers, tri-layers or more layers.

The gate insulation layer GI may be disposed on the gate line and the gate electrode GE branched therefrom. The gate insulation layer GI may include or be made of any one material selected from an inorganic insulation material such as silicon oxide (SiOx) and silicon nitride (SiNx), benzocyclobutene ("BCB"), an acrylic material and an organic insulation material such as polyimide and a combination thereof. However, the above-described materials are merely exemplary, and the material of the gate insulation layer GI is not limited thereto.

The semiconductor pattern layer 700 may be disposed on the gate insulation layer GI.

The semiconductor pattern layer 700 may include amorphous silicon or polycrystalline silicon. However, the present disclosure is not limited thereto, and the semiconductor pattern layer 700 may include an oxide semiconductor.

The semiconductor pattern layer 700 may have various shapes such as an island shape and a linear shape in the top plan view. When the semiconductor pattern layer 700 has a linear shape, the semiconductor pattern layer 700 may be provided below a data line (not shown) in a cross-sectional thickness direction (e.g., third direction orthogonal to both the first and second directions) and extend to be disposed above the gate electrode GE.

In an exemplary embodiment, the semiconductor pattern layer 700 may be patterned into a shape substantially the same as those of data lines SE and DE which will be described later in a region excluding a channel portion of a switching element of the display area DA. In other words, the semiconductor pattern layer 700 may be disposed to overlap the data lines SE and DE in the whole region thereof excluding the channel portion of the switching element. The channel portion may be interposed between the source electrode SE and the drain electrode DE facing each other. The semiconductor pattern layer 700 may be exposed at the channel portion by the source electrode SE and the drain electrode DE facing each other. The channel portion of the switching element serves to electrically interconnect the source electrode SE and the drain electrode DE, and the detailed shape thereof is not limited.

An ohmic contact layer (not shown) which is relatively highly doped with n-type impurities may be disposed on the semiconductor pattern layer 700. The ohmic contact layer may overlap the whole or a part of the semiconductor pattern layer 700. However, in an exemplary embodiment in which the semiconductor pattern layer 700 includes an oxide semiconductor, the ohmic contact layer may be omitted.

When the semiconductor pattern layer 700 is a semiconductor oxide, the semiconductor pattern layer 700 may include zinc oxide (ZnO). In addition, the semiconductor pattern layer 700 may be doped with one or more ions selected gallium (Ga), indium (In), tin (Sn), zirconium (Zr), hafnium (Hf), cadmium (Cd), silver (Ag), copper (Cu), germanium (Ge), gadolinium (Gd), titanium (Ti) and vanadium (V). In exemplary embodiments, for example, the semiconductor pattern layer 700 which is a semiconductor oxide may include one or more selected ZnO, ZnGaO, ZnInO, ZnSnO, GaInZnO, CdO, InO, GaO, SnO, AgO, CuO, GeO, GdO, HfO, TiZnO, InGaZnO and InTiZnO. However, this is merely exemplary, and the materials of oxide semiconductor are not limited thereto.

The source electrode SE and the drain electrode DE may be disposed on the semiconductor pattern layer 700. The source electrode SE may be branched from the data line (not shown) and extend to be disposed above the semiconductor pattern layer 700 in the cross-sectional thickness direction.

The drain electrode DE may be spaced apart from the source electrode SE, and may be disposed on the semiconductor pattern layer 700 such that the drain electrode DE faces the source electrode SE centering about the gate electrode GE or the channel portion of the switching element.

The source electrode SE and the drain electrode DE may have a single layer or multi-layer structure including or formed of nickel (Ni), cobalt (Co), titanium (Ti), silver (Ag), copper (Cu), molybdenum (Mo), aluminum (Al), beryllium (Be), niobium (Nb), gold (Au), iron (Fe), selenium (Se), tantalum (ta) or the like. Furthermore, an alloy of the above-enumerated metals and one or more elements selected from titanium (Ti), zirconium (Zr), tungsten (W), tantalum (Ta), niobium (Nb), platinum (Pt), hafnium (Hf), oxygen (O) and nitrogen (N) may be used.

A first passivation layer 600 may be disposed on the source electrode SE, the drain electrode DE and the semiconductor pattern layer 700. The first passivation layer 600 may include or be made of silicon oxide, silicon nitride, silicon oxynitride, aluminum oxynitride, titanium oxynitride, zirconium oxynitride, halfnium oxynitride, tantalum oxynitride, tungsten oxynitride and the like. However, this is merely exemplary, and the material of the passivation layer 600 is not limited thereto.

The first passivation layer 600 may include or define a contact hole for exposing the drain electrode DE. The pixel electrode PE which will be described later may be disposed on and extend into the contact hole at which the pixel electrode PE is electrically connected to the drain electrode DE.

The pixel electrode PE may be disposed on the first passivation layer 600. In an exemplary embodiment, the pixel electrode PE may include or be made of a transparent conductive material such as indium tin oxide ("ITO") or indium zinc oxide ("IZO"), or a reflective conductive material such as aluminum.

A second passivation layer 650 may be disposed on the pixel electrode PE. The second passivation layer 650 may include or be made of silicon oxide, silicon nitride, silicon oxynitride, aluminum oxynitride, titanium oxynitride, zirconium oxynitride, halfnium oxynitride, tantalum oxynitride, tungsten oxynitride and the like.

The common electrode CE may be disposed on the second passivation layer 650. The common electrode CE may have or define a slit pattern, and the common electrode CE may overlap the pixel electrode PE. When a voltage is applied to the common electrode CE and the pixel electrode PE, a horizontal electric field may be generated between the common electrode CE and the pixel electrode PE, and thus the liquid crystal molecules of a liquid crystal layer disposed on the common electrode CE may be controlled. Although not labeled, the liquid crystal layer is disposed between the first and second alignment layers ALN1 and ALN2 in FIG. 10.

A seal pattern SLP may be provided between the substrate S to be processed and the opposed substrate OS. The substrate S to be processed and the opposed substrate OS may be bonded to each other by the seal pattern SLP. The seal pattern SLP may be provided in the non-display area NDA, and may at least partially overlap the first alignment layer ALN1 and the second alignment layer ALN2.

The features and effects of the invention are not limited by the foregoing, and other various effects are anticipated herein.

Although exemplary embodiments of the invention have been disclosed for illustrative purposes, those skilled in the art will appreciate that various modifications, additions and substitutions are possible, without departing from the scope and spirit of the invention as disclosed in the accompanying claims.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A method for manufacturing a display device, comprising:
   preparing a substrate to be processed, the substrate to be processed including:
      a display area of the display device at which an image is displayed defined therein,
      a non-display area at which the image is not displayed defined therein,
      a first substrate of the display device,
      a first alignment layer of the display device which is on the first substrate, wherein the first alignment layer is disposed in the display area and the non-display area; and
      an overcoat layer of the display device which is disposed between the first substrate and the first alignment layer, the overcoat layer disposed in the display area and the non-display area;
   irradiating ultraviolet rays to the substrate to be processed including the first alignment layer and the overcoat layer which is exposed from the first alignment layer in the non-display area, by using a mask having a transmitting portion which transmits the ultraviolet rays to the first alignment layer of the substrate to be processed and a blocking portion which blocks transmission of the ultraviolet rays to the overcoat layer in the non-display area of the substrate to be processed; and
   bonding an opposed substrate which faces the substrate to be processed to the substrate to be processed.

2. The method of claim 1, wherein in irradiating ultraviolet rays to the substrate to be processed, the transmitting portion of the mask is disposed to face the display area of the substrate to be processed and the blocking portion of the mask is disposed to face the non-display area of the substrate to be processed.

3. The method of claim 1, wherein irradiating ultraviolet rays to the substrate to be processed includes irradiating the ultraviolet rays to the display area of the substrate to be processed through the transmitting portion of the mask to align the first alignment layer.

4. The method of claim 1, wherein the substrate to be processed further includes a color filter of the display device which is on the first substrate.

5. The method of claim 1, wherein the opposed substrate which is bonded to the substrate to be processed includes a second substrate of the display device, a pixel electrode of the display device which is on the second substrate, and a common electrode of the display device which is on the pixel electrode.

6. The method of claim 5, wherein the pixel electrode and the common electrode of the opposed substrate form a horizontal electric field therebetween.

7. The method of claim 1, the substrate to be processed further includes a plurality of cells, and each of the cells includes the display area of the display device at which an image is displayed and the non-display area of the display device at which the image is not displayed, the non-display area disposed outside the display area, and
   the first alignment layer is disposed in each of the display areas and extends therefrom to the non-display areas.

8. The method of claim 7, wherein among the plurality of cells of the substrate to be processed, the transmitting portion of the mask corresponds to the display area of each cell and the blocking portion of the mask corresponds to the non-display area of each cell.

9. The method of claim 8, wherein the mask defines the transmitting portion in plural arranged in a matrix having a plurality of rows and a plurality of columns.

* * * * *